United States Patent [19]

Homuth

[11] Patent Number: 5,001,337
[45] Date of Patent: Mar. 19, 1991

[54] FIBER OPTIC GEOPHYSICAL SENSORS

[75] Inventor: Emil F. Homuth, Los Alamos, N. Mex.

[73] Assignee: The United States of America as represented by the United States Department of Energy, Washington, D.C.

[21] Appl. No.: 506,741

[22] Filed: Apr. 10, 1990

[51] Int. Cl.[5] .............................................. H01J 5/16
[52] U.S. Cl. ................................ 250/227.19; 356/345
[58] Field of Search .................. 250/227.19; 356/345; 73/655, 862.37, 517 R, 705; 367/149

[56] References Cited

U.S. PATENT DOCUMENTS

| | | | |
|---|---|---|---|
| 4,495,411 | 1/1985 | Rashleigh | 250/227.19 |
| 4,529,876 | 7/1985 | Walker | 356/350 |
| 4,530,603 | 7/1985 | Shaw et al. | 356/345 |
| 4,613,752 | 9/1986 | Davis | 350/96.15 |
| 4,627,728 | 12/1986 | Willson | 356/345 |
| 4,678,909 | 7/1987 | Jackson et al. | 73/705 |
| 4,697,876 | 10/1987 | Dyott | 250/227.19 |
| 4,893,930 | 1/1990 | Garrett et al. | 356/345 |

OTHER PUBLICATIONS

D. A. Jackson, A. Dandridge, and S. K. Sheem, "Measurement of Small Phase Shifts Using a Single-Mode Optical-Fiber Interferometer", vol. 5, No. 4, Optics Letters, Apr. 1980.
L. F. Stokes, M. Chodorow, and H. J. Shaw, "All-Single-Mode Fiber Resonator", vol. 7, No. 6, Optics Letters, Jun. 1982.
G. A. Sanders, M. G. Prentiss, and S. Ezekiel, Optics Letters, "Passive Ring Resonator Method for Sensitive Inertial Rotation Measurements in Geophysics and Relativity", vol. 6, No. 11, Nov. 1982.
S. J. Petuchowski, T. G. Giallorenzi, and S. K. Sheem, IEEE Journal of Quantum Electronics, "A Sensitive Fiber-Optic Fabry-Perot Interferometer", Nov. 1981.
P. R. Ball and B. Culshaw, Electronics Letters, "Single-Mode Fibre Optic Directional Coupler", vol. 16, No. 7, 259-260, Mar. 27, 1980.
M. Kubota, T. Oohara, K. Furuya, and Y. Suematsu, "Control on Single-Mode Optical Fibres", Electronics Letters, vol. 16, No. 15, Jul. 17, 1980.
Mario Martinelli, "Unlimited Phase Compensator for Fiber-Optic Interferometric Detection of Slow Temperature Change", Optics Letters, vol. 9, No. 9, 429, Sep. 1984.
"High Sensitivity Fiber Optic Sensor", Sensor Technology, 7-8, Aug., 1985.
"Single-Mode Fiber Used in Experimental Seismic Sensor", Laser Focus/Electro-Optics, 70, Sep., 1985.
"New Sensing Device May Predict Earthquakes", Los Alamos Public Affairs Office News Release, Feb. 28, 1986.
"Super Sensor Predicts 'Quakes", Design News, 47, May 5, 1986.
"Fiber Optics Borehole Earth Strainmeter (Fobes)", Stamped Dec. 14, 1988.
"In Situ Fiber Optic Earth Strain Sensors for CFE Verification Applications", by E. F. Homuth, Nov. 1, 1989.

Primary Examiner—David C. Nelms
Assistant Examiner—Stephone B. Allen
Attorney, Agent, or Firm—Milton D. Wyrick; Paul D. Gaetjens; William R. Moser

[57] ABSTRACT

A fiber optic geophysical sensor in which laser light is passed through a sensor interferometer in contact with a geophysical event, and a reference interferometer not in contact with the geophysical event but in the same general environment as the sensor interferometer. In one embodiment, a single tunable laser provides the laser light. In another embodiment, separate tunable lasers are used for the sensor and reference interferometers. The invention can find such uses as monitoring for earthquakes, and the weighing of objects.

14 Claims, 2 Drawing Sheets

FIBER OPTIC GEOPHYSICAL SENSORS

BACKGROUND OF THE INVENTION

The present invention generally relates to the field of geophysical sensors such as earthquake monitors, and more specifically to very sensitive geophysical sensors utilizing fiber optics. The invention is a result of a contract with the Department of Energy (Contract No. W-7405-ENG-36).

It is vitally important that as much notice as possible be given of impending earthquakes so that measures can be taken to save lives and protect property. To this point, geophysical sensors, while more sensitive than in the past, do not provide information useful in predicting an imminent earthquake threat. In order to achieve the goal of sufficient advance warning, there is a necessity for instruments which can, in one unit, measure dynamic earth strains ranging from the minute to the large, and which may change on a time scale ranging from seconds to many years. Such an instrument is not currently available.

In the past, measurement of earth movements has been primarily accomplished with seismometers. These somewhat delicate instruments have been employed for decades, and consist of an expensive, sophisticated spring mass system and a moving magnet coil transducer. Although these instruments have enjoyed wide acceptance, seismometers are noted for numerous mechanical problems. Notable among these problems are non-linear, parametric, and exaggerated tilt response; mechanical drift; "spring ringing" excited by high frequency waves; and a general lack of sturdiness. Additionally, the seismometer is not suited for measurement of extremely small long term earth strains such as are known to be the precursors of an earthquake.

The present invention addresses and solves these problems by utilizing fiber optic technology in an interferometry configuration to detect and measure small earth strains. The detection of these small strains can be used in numerous areas such as earthquake prediction, as well as oil well monitoring, explosive diagnostics, underground waste storage monitoring, and equipment weighing and identification. The unit should provide the early warning necessary to allow measures to be taken to protect persons and property in the event of an earthquake.

It is therefore an object of the present invention to provide apparatus which is sensitive to very small earth strains, which may change at very slow rates.

It is another object of the present invention to provide earth strain detection apparatus which is insensitive to extraneous interference.

It is a further object of the present invention to provide apparatus capable of measuring a wide range of geophysical events involving naturally occurring or manmade strains.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus of this invention comprises a fiber optic sensor system for obtaining information related to geophysical events comprising a tunable laser source having an output frequency related to a reference interferometer optically coupled to the laser source. First servo means are connected to the reference interferometer and to the laser source for tuning the laser source to optical resonance with the reference interferometer. Frequency shifting means are optically coupled to the laser source for outputting the output frequency of the tunable laser shifted by a determinable quantity. A sensor interferometer is optically coupled to the frequency shifting means and has an output functionally related to the laser source and to the geophysical events. Mounting means are effective to place the reference interferometer and the sensor interferometers in substantially identical temperature environments while isolating the reference interferometer from the geophysical events and coupling the sensor to the geophysical events. Second servo means are connected to the sensor interferometer and to the frequency shifting means for tuning the output of the frequency shifting means to optical resonance with the sensor interferometer. And beam splitting means are optically coupled to the output of the frequency shifting means and to the laser source for optically summing the output frequency of the tunable laser with the output of the frequency shifting means and outputting the sum, the sum being functionally related to the geophysical events.

In a further aspect of the present invention, and in accordance with its objects and purposes, a fiber optic sensor system for obtaining information related to geophysical events comprises a tunable reference laser having a reference interferometer optically coupled to the reference laser. First servo means are connected to the reference interferometer and to the reference laser for tuning the reference laser source to optical resonance with the reference interferometer. A tunable sensor laser is optically coupled to a sensor interferometer and has an output functionally related to the sensor laser and to the geophysical event. Second servo means are connected to the sensor interferometer and to the sensor laser for tuning the sensor laser source to optical resonance with the sensor interferometer. Mounting means are effective to place the reference and sensor interferometers in substantially equivalent temperature environments while isolating the reference interferometer from the geophysical event and coupling the sensor interferometer to the geophysical event. And detecting means are connected to the reference laser and to the sensor laser for detecting differences in frequency between the reference laser and the sensor laser, which difference is functionally related to the geophysical event acting on the sensor interferometer.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

Figure 1:
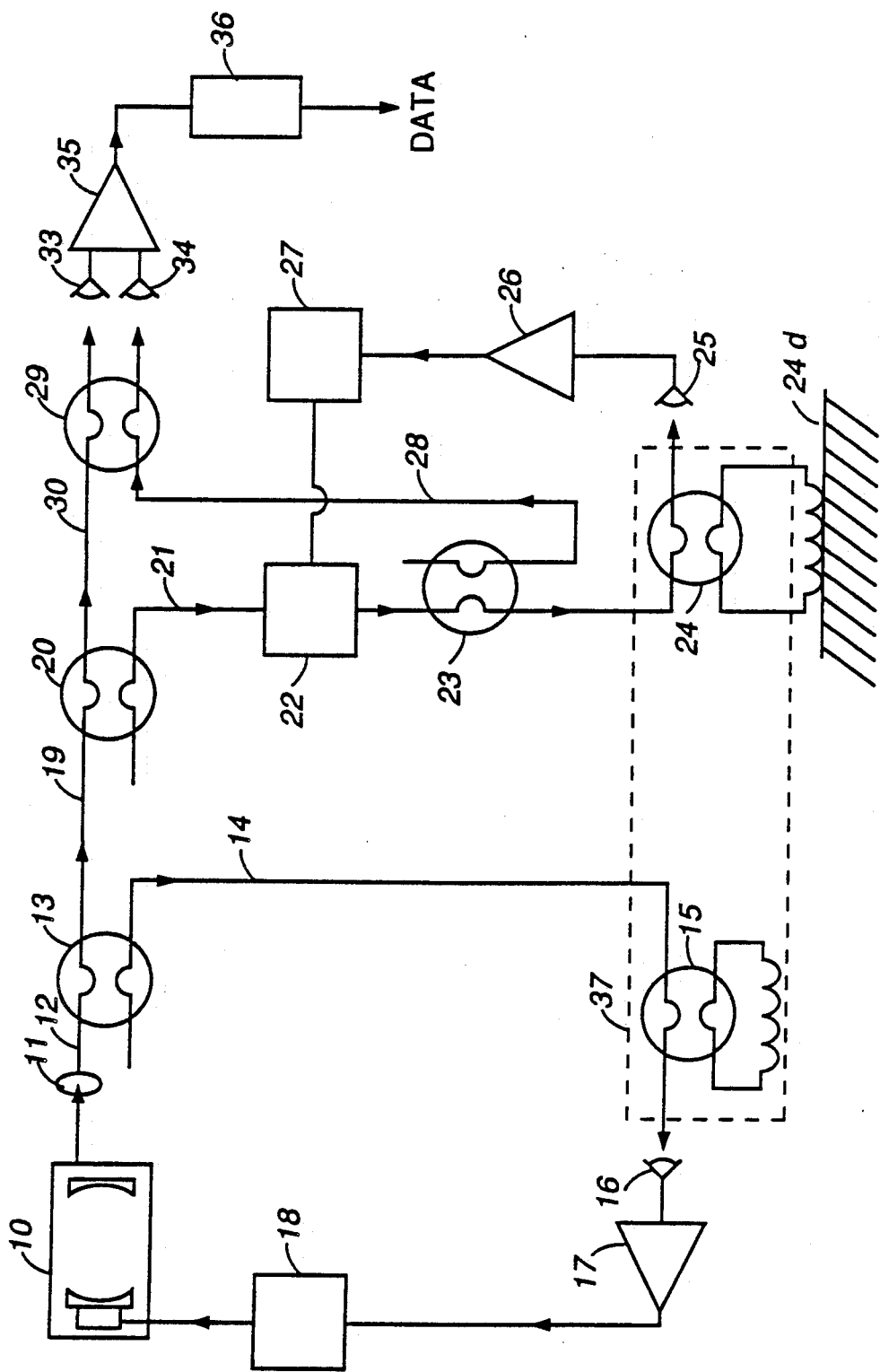
FIG. 1 is a schematic representation of an embodiment of the present invention in which a single laser is employed.

The present invention detects minute strains, such as the strains which are normally precursors to an earthquake. It accomplishes this by use of a unique interferometer configuration. The invention can best be appreciated by reference to FIG. 1, where one embodiment is schematically depicted. In FIG. 1, tunable laser 10 outputs a laser beam, at a frequency, $f_c$, which is one of the eigenmodes, or optically resonant frequencies, of reference interferometer 15, more fully described below. This laser beam is input into optical fiber 12 through coupling lens 11, and then through fiber optic beam splitter 13. In beam splitter 13, a portion of the laser light is continued in fiber 19, while the remaining portion is coupled into fiber 14.

The particular type laser for tunable laser 10 is not important as long as it is single frequency and tunable, and capable of outputting between 0.5 and 10 mW. Solid state lasers offer certain advantages because of their longer life, output wavelengths close to most fiber wavelengths, and greater available power. The lasers must be capable of producing light with a wavelength range compatible with the optical fiber used. Single mode telecommunications fiber has performed well in the present invention. However, other special type optical fibers, such as polarization maintaining fibers, would work very well, but are more expensive.

Fiber 14 conveys its light into reference interferometer 15, which is a coil of optical fiber which may be connected as a ring resonator interferometer. As previously stated, it is one of the eigenmodes, or optically resonant frequencies, of reference interferometer 15 to which the output frequency of tunable laser 10 is tuned. The output of reference interferometer 15 is coupled into photodetector 16, and from photodetector 16 into photodetector amplifier 17. The output of photodetector amplifier 17 is input to reference servo 18. Reference servo 18 is connected to reference laser source 10 for tuning laser source 10 to an optical resonance (eigenmode) of reference interferometer 15. By this means, the high stability of reference interferometer 15 is transferred to tunable laser 10, thereby producing very low phase noise and very high long term stability in tunable laser 10. Reference interferometer 15 is located in the same general environment as sensor interferometer 24 but is isolated from the geophysical event. It does, however, experience the same thermal conditions as sensor interferometer 24.

Output fiber 19 from fiber optic beam splitter 13 couples light into fiber optic beam splitter 20 to provide light for sensor interferometer 24. Fiber 21 couples a portion of light at frequency, $f_c$, to electro/optic frequency shifter 22. Electro/optic frequency shifter 22 (Bragg cell) is available from several commercial manufacturers. Electro/optic frequency shifter 22 shifts the frequency of light input to it by a variable amount, represented as $\pm \Delta f$, and outputs light at this shifted frequency to fiber optic beam splitter 23, where a portion is coupled to sensor interferometer 24. Sensor interferometer 24 may also be connected as a ring resonator interferometer, and is directly coupled to whatever geophysical feature 24a that is to be monitored. Reference interferometer 15 is located in the same environment as sensor interferometer 24, but is not coupled to geophysical feature 24a. This environment is indicated in FIG. 1 by enclosure 37, shown by dotted lines.

The output of sensor interferometer 24 is coupled to photodetector 25 and input to photodetector amplifier 26. The output of photodetector amplifier 26 is connected to sensor servo 27. Initially, sensor servo 27 adjusts the output frequency of electro/optic frequency shifter 22 to coincide with a resonant frequency (eigenmode) of sensor interferometer 24. As geophysical feature 24a causes a change in the optical path length of sensor interferometer 24, the eigenmodes of sensor interferometer 24 are shifted in frequency by an amount, $\pm \Delta f$. Sensor servo 27 again adjusts the output frequency of electro/optic frequency shifter 22 to coincide with the shift in the previously selected eigenmode of sensor interferometer 24.

The output of electro/optic frequency shifter 22 may be represented as $f_c \pm \Delta f$. The term, $\pm \Delta f$ represents the frequency shift created by the effect of a geophysical event on sensor interferometer 24, and is proportional to the strain, $\Delta \epsilon$, produced on sensor interferometer 24. Electro/optic frequency shifter 22 outputs light at a frequency, $f_c \pm \Delta f$, to fiber optic beam splitter 23. Fiber 28 is output from fiber optic beam splitter 23 with light at the frequency of $f_c \pm \Delta f$, and couples this light to fiber optic beam splitter 29. As shown, fiber 30, which is output from fiber optic beam splitter 20, couples light at a frequency of $f_c$ also into fiber optic beam splitter 29.

In fiber optic beam splitter 29, coupling between light in fiber 28 and fiber 30 occurs, so that light output from fiber optic beam splitter 29 consists of two optical frequencies, $f_c$ and $f_c \pm \Delta f$. These optical frequencies are output to photodetectors 33, 34 where non-linear mixing (heterodyning) occurs, resulting in a radio frequency output from photodetectors 33, 34 of:

$$f_c - (f_c \pm \Delta f) = \pm \Delta f. \qquad (1)$$

where $\pm \Delta f$ is proportional to the geophysical event which is being monitored. The output of photodetectors 33, 34 is connected to amplifier 35. The output of amplifier 35 is input to frequency counter 36, with the output of frequency counter 36 producing data for whatever display (not shown) is desired. Most any amplifier can be used as long as its frequency response is suitable for a frequency range compatible with the expected range of $\Delta f$.

Figure 2:
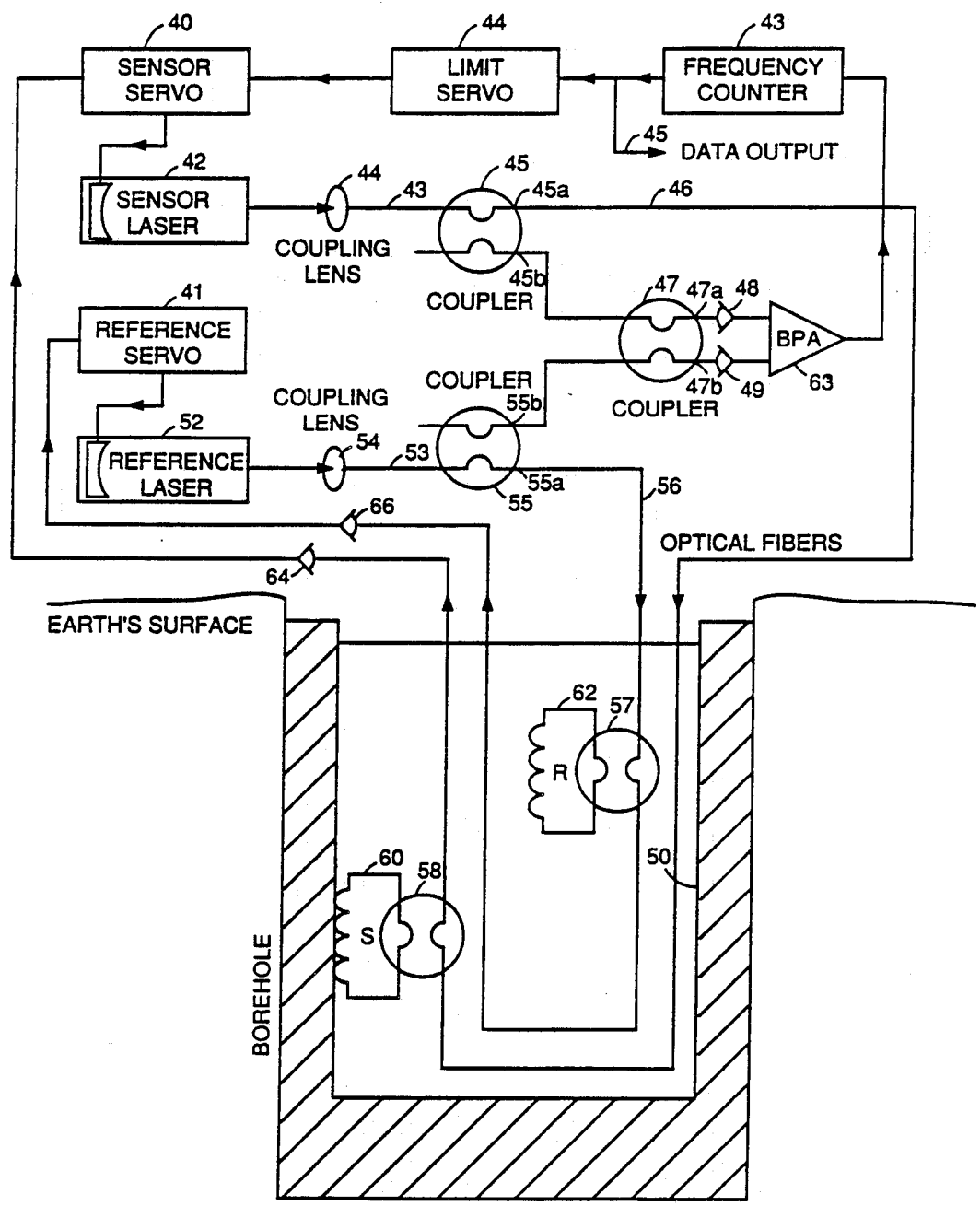
FIG. 2 is a schematic representation of another embodiment of the present invention in which both a reference laser and a sensor laser are employed.

Another embodiment of the present invention is illustrated in FIG. 2, in which two lasers are employed, one for the reference interferometer, and the other for the sensor interferometer. In FIG. 2, the configuration comprises sensor laser 42, whose output is input to optical fiber 43, by means of coupling lens 44, and through fiber optic beam splitter 45. From fiber optic beam splitter 45, output 45a is coupled to sensor optical fiber 46, and output 45b is optically coupled to fiber optic beam splitter 47.

Similarly, the output of reference laser 52 is coupled into optical fiber 53 by means of coupling lens 54 before being input into fiber optic beam splitter 55. Fiber optic beam splitter 55 has output 55a optically connected to reference optical fiber 56, and output 55b optically connected to fiber optic beam splitter 47.

Sensor optical fiber 46 and reference optical fiber 56 continue to sensor body 50 which may be at a distant location. Sensor body 50 may be a cylinder of convenient diameter and length and is only one possible configuration which could be used with either embodiment of the invention disclosed herein.

Inside sensor body 50, sensor optical fiber 46 is passed through sensor interferometer 58. Sensor interferometer 58, which is identical in basic construction to sensor interferometer 24 (FIG. 1), has its sensing element 60, a coil of optical fiber wound around the outside surface of sensor body 50.

Similarly, reference optical fiber 56 enters sensor body 50 and passes through reference interferometer 57. Reference interferometer 57 is also identical to reference interferometer 15 (FIG. 1). Its reference element 62 is a coil of optical fiber wound around a form (not shown) having a smaller diameter than the inside diameter of sensor body 50. This allows reference interferometer 57 to be placed inside sensing element 60, isolating reference element 62 from any forces acting on sensor interferometer 60, but exposing it to an environment otherwise similar to the environment of sensing element 60.

Reference optical fiber 56 continues out of sensor body 50, and has its light input into photodetector 66. The output of photodetector 66 is connected to reference servo 41. Reference servo 41 tunes the frequency of reference laser 52 to a resonant frequency (eigenmode) of reference interferometer 57, and maintains this frequency thereby stabilizing reference laser 52. If the output frequency of reference laser 52 drifts, reference servo 41 will respond, and retune reference laser 52 to the selected eigenmode of reference interferometer 57. By these means, the high stability of reference interferometer 57 is transferred to reference laser 52, thereby producing very low phase noise and very high long term stability in reference laser 52.

Sensor optical fiber 46 also continues back out of sensor body 50, and its light is input into photodetector 64. The output of photodetector 64 is connected to sensor servo 40. Sensor servo 40 maintains the operation of sensor laser 42 at a selected resonant frequency (eigenmode) of sensor interferometer 58.

The number of turns of sensing element 60 is variable according to the degree of sensitivity desired. For most geophysical applications, 50 to 150 meters of optical fiber is sufficient. Reference element 62 may have fewer turns than sensing element 60. By being located inside sensor body 50, reference element 62 is isolated from geophysical events, but is exposed to substantially the same temperature environment as sensing element 60.

Output 47a of fiber optic beam splitter 47 is input to photodetector 48, whose output is input to amplifier 63. Likewise, output 47a of fiber optic beam splitter 47 is connected to photodetector 49, whose output is also input to amplifier 63. Outputs 47a and 47b contain signals identical in nature to those output from fiber optic beam splitter 29 (FIG. 1). In like manner, these signals undergo non-linear mixing in photodetectors 48, 49, producing a radio frequency heterodyne signal which is proportional to the geophysical event. This signal is amplified by amplifier 63, and output to frequency counter 43. The output of frequency counter 43, which is proportional to the geophysical event, is output to data line 45 for recordation and/or display, and to limit servo 44.

Limit servo 44 serves to maintain the heterodyne signal within the bandpass of the combination of photodetectors 48, 49 and amplifier 63. It also prevents the output frequency of sensor laser 42 from going through the output frequency of reference laser 52 (i.e. zero beat).

As with the previous embodiment, sensor laser 42 and reference laser 52 may be of the solid state type because of a longer expected lifetime. Power output is not usually critical, and outputs of 0.1 to 10 mW are sufficient for most applications. Also as before, the lasers must be capable of producing light with a wavelength compatible with the optical fiber used.

For earthquake detection and other similar applications, sensor body 50 would be buried deep into the surface of the earth and grouted in place, assuring that sensor interferometer 58 is well coupled to the surrounding rock. A deeper hole also can provide a more noise free environment, a consideration due to the excellent sensitivity of the present invention. A grout made of epoxy and sand has performed well over a considerable amount of time. As indicated in FIGS. 1 and 2, sensor body 50 can be located a considerable distance from the electronic and control equipment, with only four optical fibers going underground. And, as stated previously, a configuration similar to that described for sensor body 50 can be used with either embodiment of the present invention.

With reference again to FIG. 1, the present invention can find application in areas other than geophysical sensing. For example, sensor interferometer 24 may be placed below but in contact with a pad (not shown) onto which large objects, such as trucks or tanks could be placed. Reference interferometer 15 would also be placed under the pad, but not in contact with it. After calibration, the strain produced in sensor interferometer 24 is related to the weight of the truck or tank. Also, as the output from frequency counter 36 is variable over time, signatures of objects passing over the pad can be used for identification purposes.

It is important to understand that the present invention can perform its functions without regard to common extraneous interference or damage, such as is produced by lightning and other electromagnetic sources. Also, in contrast to other geophysical sensors, no electrical wiring or plumbing goes down hole with the sensor. These features and the extremely high stability provided by the techniques used in the present invention provide for very long operating lifetimes and for long term geophysical event measurements.

The foregoing description of embodiments of the invention have been presented for purposes of illustration and description. It is not intended to be exhaustive or to limit the invention to the precise forms disclosed, and obviously many modifications and variations are possible in light of the above teachings. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A fiber optic sensor system for obtaining information related to geophysical events comprising:
a tunable laser source having an output frequency;
a reference interferometer optically coupled to said laser source;
first servo means connected to said reference interferometer and to said laser source for tuning said laser source to optical resonance with said reference interferometer;

frequency shifting means optically coupled to said laser source for outputting said output frequency of said tunable laser shifted by a determinable quantity;

a sensor interferometer optically coupled to said frequency shifting means having an output functionally related to said laser source and to said geophysical events;

mounting means effective to place said reference interferometer and said sensor interferometers in substantially identical temperature environments while isolating said reference interferometer from said geophysical events and coupling said sensor to said geophysical events;

second servo means connected to said sensor interferometer and to said frequency shifting means for tuning said output of said frequency shifting means to optical resonance with said sensor interferometer; and beam splitting means optically coupled to said output of said frequency shifting means and to said laser source for optically summing said output frequency of said tunable laser with said output of said frequency shifting means and outputting said sum, said sum being functionally related to said geophysical events.

2. The fiber optic sensor as described in claim 1 wherein said tunable laser is a solid state laser.

3. The fiber optic sensor as described in claim 1 wherein said reference interferometer comprises a ring resonator interferometer.

4. The fiber optic sensor as described in claim 1 wherein said sensor interferometer comprises a ring resonator interferometer.

5. The fiber optic sensor as described in claim 1 wherein said mounting means comprises a cylinder with said reference interferometer mounted inside said cylinder and said sensor interferometer mounted outside said cylinder.

6. The fiber optic sensor as described in claim 5 wherein said mounting means is grouted in place below the earth's surface.

7. The fiber optic sensor as described in claim 1 wherein said sum is output to an amplifier and then to a frequency counter.

8. A fiber optic sensor system for obtaining information related to geophysical events comprising:

a tunable reference laser;

a reference interferometer optically coupled to said reference laser;

first servo means connected to said reference interferometer and to said reference laser for tuning said reference laser source to optical resonance with said reference interferometer;

a tunable sensor laser;

a sensor interferometer optically coupled to said sensor laser source having an output functionally related to said sensor laser source and to said geophysical event;

second servo means connected to said sensor interferometer and to said sensor laser for tuning said sensor laser source to optical resonance with said sensor interferometer;

mounting means effective to place said reference and sensor interferometers in substantially equivalent temperature environments while isolating said reference interferometer from said geophysical event and coupling said sensor interferometer to said geophysical event;

detecting means connected to said reference laser and to said sensor laser for detecting differences in frequency between said reference laser and said sensor laser, which difference is functionally related to said geophysical event acting on said sensor interferometer.

9. The fiber optic sensor as described in claim 1, wherein said reference laser and said sensor laser are solid state lasers.

10. The fiber optic sensor as described in claim 1, wherein said reference interferometer comprises a ring resonator interferometer.

11. The fiber optic sensor as described in claim 1, wherein said sensor interferometer comprises a ring resonator interferometer.

12. The fiber optic sensor as described in claim 1 wherein said mounting means comprises a cylinder with said reference interferometer mounted inside said cylinder and said sensor interferometer mounted outside said cylinder.

13. The fiber optic sensor as described in claim 12 wherein said mounting means is grouted in place below the earth's surface.

14. The fiber optic sensor as described in claim 8 wherein said detecting means includes a plurality of photodetectors, an amplifier, and a frequency counter.

* * * * *